United States Patent
Kim et al.

(10) Patent No.: US 11,663,516 B2
(45) Date of Patent: May 30, 2023

(54) ARTIFICIAL INTELLIGENCE APPARATUS AND METHOD FOR UPDATING ARTIFICIAL INTELLIGENCE MODEL

(71) Applicant: LG Electronics Inc., Seoul (KR)

(72) Inventors: Jaehong Kim, Seoul (KR); Taeho Lee, Seoul (KR); Hangil Jeong, Seoul (KR); Jongwoo Han, Seoul (KR)

(73) Assignee: LG Electronics Inc., Seoul (KR)

( * ) Notice: Subject to any disclaimer, the term of this patent is extended or adjusted under 35 U.S.C. 154(b) by 705 days.

(21) Appl. No.: 16/653,437

(22) Filed: Oct. 15, 2019

(65) Prior Publication Data

US 2020/0042832 A1 Feb. 6, 2020

(30) Foreign Application Priority Data

Sep. 9, 2019 (KR) .......................... 10-2019-0111340

(51) Int. Cl.
*G06K 9/62* (2022.01)
*G06N 3/08* (2023.01)

(52) U.S. Cl.
CPC .......... *G06K 9/6262* (2013.01); *G06K 9/623* (2013.01); *G06K 9/6256* (2013.01); *G06N 3/08* (2013.01)

(58) Field of Classification Search
CPC .......... G06N 3/08; G06N 20/00; G06N 7/005; G06N 3/02; G06K 9/6271; G06K 9/6256; G06K 9/623; G06K 9/6262; G06K 9/62; G06V 10/82
See application file for complete search history.

(56) References Cited

U.S. PATENT DOCUMENTS 10,860,860 B1 * 12/2020 Huynh .................... H04N 21/84
2020/0349390 A1 * 11/2020 Konwar ................. G06N 20/00

* cited by examiner

*Primary Examiner* — Tuan H Nguyen
(74) *Attorney, Agent, or Firm* — Fish & Richardson P.C.

(57) ABSTRACT

Disclosed herein an artificial intelligence apparatus for updating an artificial intelligence model including a memory configured to store an artificial intelligence model and training data for the artificial intelligence model and a processor configured to receive sensor data, calculate a confidence level of the received sensor data for the stored artificial intelligence model, label the received sensor data if the calculated confidence level is less than a reference value, store the labeled received sensor data in the memory as the training data or test data, and update the stored artificial intelligence model using the stored training data.

14 Claims, 8 Drawing Sheets

ARTIFICIAL INTELLIGENCE APPARATUS AND METHOD FOR UPDATING ARTIFICIAL INTELLIGENCE MODEL

CROSS-REFERENCE TO RELATED APPLICATIONS

This application claims priority to Korean Patent Application No. 10-2019-0111340 filed on Sep. 9, 2019, the entire contents of which is hereby incorporated by reference in its entirety.

BACKGROUND

The present disclosure relates to an artificial intelligence (AI) apparatus and method for updating an artificial intelligence model, and more particularly, to an artificial intelligence apparatus and method for directly selecting training data to be used to train an artificial intelligence model and updating the artificial intelligence model.

Recently, apparatuses for providing various functions using an artificial intelligence model generated using a machine learning algorithm or a deep learning algorithm are increasing. For example, apparatuses for interacting with users by speech using a speech recognition model or recognizing an object or a user using an image recognition model are increasing.

Currently, due to limitations in storage space or computing power, most edge devices do not have artificial intelligence models installed therein. Similarly, most edge devices cannot directly train the artificial intelligence models due to limitations in computing power of the edge devices. Such edge devices operate depending on an artificial intelligence (AI) server and communication with the AI server is essential.

In addition, a lot of human resources are required to generate a label in training data used to train the artificial intelligence model.

As the storage space and computing power of the edge devices increase with technical advancement, it is expected that the edge devices will directly train, store and use the artificial intelligence models. However, since the performance of the edge devices is still inferior to the AI server, there is a need for technique for efficiently training the artificial intelligence model without human intervention.

SUMMARY

An object of the present disclosure is to provide an artificial intelligence apparatus and method for storing an artificial intelligence model, selecting sensor data to be used to train the artificial intelligence model from acquired sensor data to generate training data, and updating the artificial intelligence model using the generated training data.

According to an embodiment, provided are an artificial intelligence apparatus for receiving sensor data, calculating a confidence level of the received sensor data for a stored artificial intelligence model, labeling sensor data, the calculated confidence level of which is less than a reference value, storing the labeled sensor data as the training data or test data, and updating the stored artificial intelligence model using the stored training data, and a method thereof.

According to an embodiment, provided are an artificial intelligence apparatus for labeling sensor data by extracting a label from sensor data, the calculated confidence level of which is less than a reference value, using a pseudo labeler and a method thereof.

According to an embodiment, provided are an artificial intelligence apparatus for generating a result from received sensor data using a stored artificial intelligence model and calculating a confidence level of the received sensor data based on an entropy corresponding to the generated result, a first-rank confidence level included in the generated result or a difference between the first-rank confidence level and a second-rank confidence level included in the generated result, and a method thereof.

BRIEF DESCRIPTION OF THE DRAWINGS

The present disclosure will become more fully understood from the detailed description given herein below and the accompanying drawings, which are given by illustration only, and thus are not limitative of the present disclosure, and wherein.

DETAILED DESCRIPTION OF THE EMBODIMENTS

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

Here, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

Figure 1:
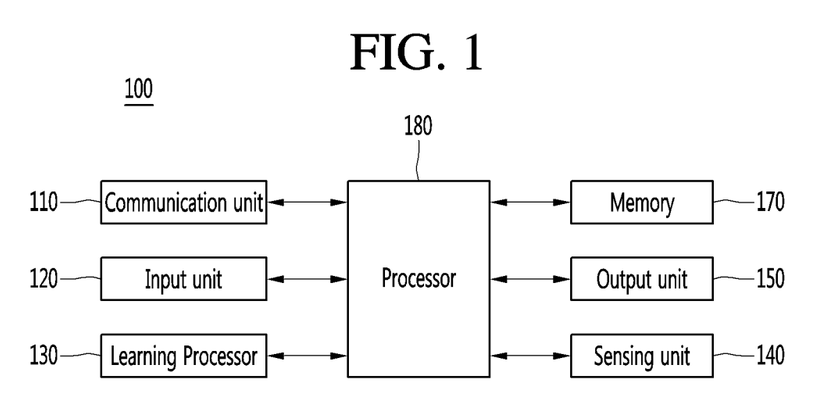
FIG. 1 is a block diagram illustrating an AI apparatus according to an embodiment of the present disclosure.

FIG. 1 is a block diagram illustrating an AI apparatus 100 according to an embodiment of the present disclosure.

Hereinafter, the AI apparatus 100 may be referred to as a terminal.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication unit 110, an input unit 120, a learning processor 130, a sensing unit 140, an output unit 150, a memory 170, and a processor 180.

The communication unit 110 may transmit and receive data to and from external devices such as other 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

Here, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a training data for model learning and an input data to be used when an output is acquired by using learning model. The input unit 120 may acquire raw input data. Here, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

Here, the learning processor 130 may perform AI processing together with the learning processor 240 of the AI server 200.

Here, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing unit 140 may acquire at least one of internal information about the AI apparatus 100, ambient environment information about the AI apparatus 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

Here, the output unit 150 may include a display unit for outputting time information, a speaker for outputting auditory information, and a haptic module for outputting haptic information.

The memory 170 may store data that supports various functions of the AI apparatus 100. For example, the memory 170 may store input data acquired by the input unit 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
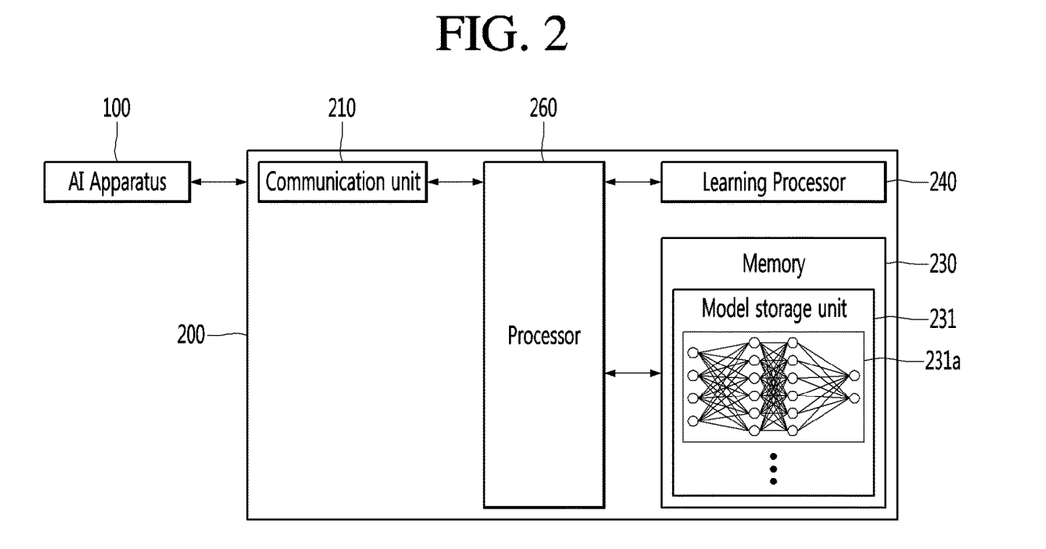
FIG. 2 is a block diagram illustrating an AI server according to an embodiment of the present disclosure.

FIG. 2 is a block diagram illustrating an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. Here, the AI server 200 may be included as a partial configuration of the AI apparatus 100, and may perform at least part of the AI processing together.

The AI server 200 may include a communication unit 210, a memory 230, a learning processor 240, a processor 260, and the like.

The communication unit 210 can transmit and receive data to and from an external device such as the AI apparatus 100.

The memory 230 may include a model storage unit 231. The model storage unit 231 may store a learning or learned model (or an artificial neural network 231*a*) through the learning processor 240.

The learning processor 240 may learn the artificial neural network 231*a* by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
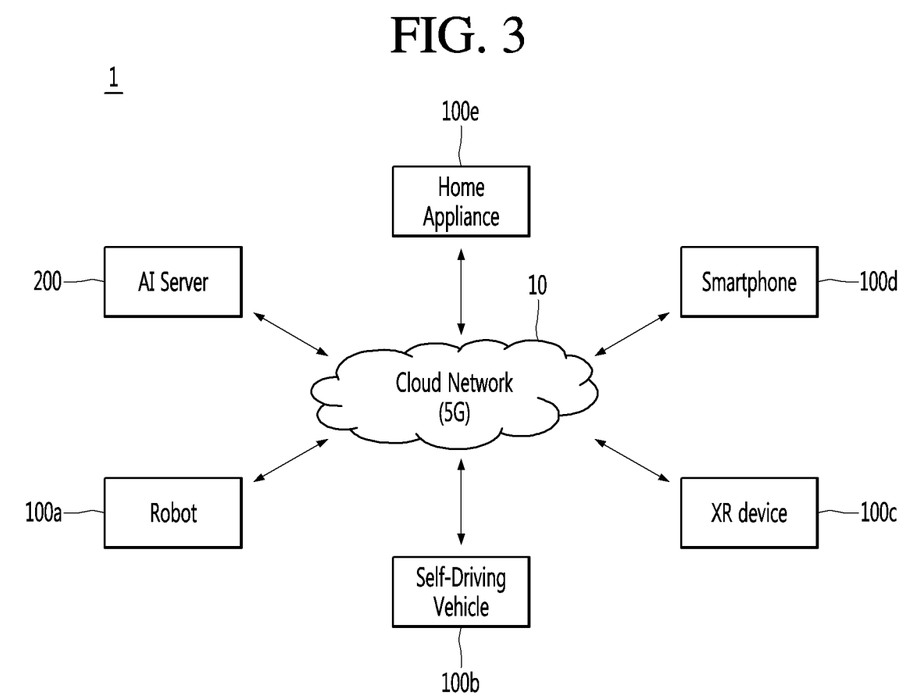
FIG. 3 is a view illustrating an AI system according to an embodiment of the present disclosure.

FIG. 3 is a view illustrating an AI system 1 according to an embodiment of the present disclosure.

Referring to FIG. 3, in the AI system 1, at least one of an AI server 200, a robot 100*a*, a self-driving vehicle 100*b*, an XR device 100*c*, a smartphone 100*d*, or a home appliance 100*e* is connected to a cloud network 10. The robot 100*a*, the self-driving vehicle 100*b*, the XR device 100*c*, the smartphone 100*d*, or the home appliance 100*e*, to which the AI technology is applied, may be referred to as AI apparatuses 100*a* to 100*e*.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100*a* to 100*e* and 200 configuring the AI system 1 may be connected to each other through the cloud network 10. In particular, each of the devices 100*a* to 100*e* and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100*a*, the self-driving vehicle 100*b*, the XR device 100*c*, the smartphone 100*d*, or the home appliance 100*e* through the cloud network 10, and may assist at least part of AI processing of the connected AI apparatuses 100*a* to 100*e*.

Here, the AI server 200 may learn the artificial neural network according to the machine learning algorithm instead of the AI apparatuses 100*a* to 100*e*, and may directly store the learning model or transmit the learning model to the AI apparatuses 100*a* to 100*e*.

Here, the AI server 200 may receive input data from the AI apparatuses 100*a* to 100*e*, may infer the result value for the received input data by using the learning model, may generate a response or a control command based on the inferred result value, and may transmit the response or the control command to the AI apparatuses 100*a* to 100*e*.

Alternatively, the AI apparatuses 100*a* to 100*e* may infer the result value for the input data by directly using the learning model, and may generate the response or the control command based on the inference result.

Hereinafter, various embodiments of the AI apparatuses 100*a* to 100*e* to which the above-described technology is applied will be described. The AI apparatuses 100*a* to 100*e* illustrated in FIG. 3 may be regarded as a specific embodiment of the AI apparatus 100 illustrated in FIG. 1.

<AI+Robot>

The robot 100*a*, to which the AI technology is applied, may be implemented as a guide robot, a carrying robot, a cleaning robot, a wearable robot, an entertainment robot, a pet robot, an unmanned flying robot, or the like.

The robot 100*a* may include a robot control module for controlling the operation, and the robot control module may refer to a software module or a chip implementing the software module by hardware.

The robot 100*a* may acquire state information about the robot 100*a* by using sensor information acquired from various kinds of sensors, may detect (recognize) surrounding environment and objects, may generate map data, may determine the route and the travel plan, may determine the response to user interaction, or may determine the operation.

The robot 100*a* may use the sensor information acquired from at least one sensor among the lidar, the radar, and the camera so as to determine the travel route and the travel plan.

The robot 100*a* may perform the above-described operations by using the learning model composed of at least one artificial neural network. For example, the robot 100*a* may recognize the surrounding environment and the objects by using the learning model, and may determine the operation by using the recognized surrounding information or object information. The learning model may be learned directly from the robot 100*a* or may be learned from an external device such as the AI server 200.

Here, the robot 100*a* may perform the operation by generating the result by directly using the learning model, but the sensor information may be transmitted to the external device such as the AI server 200 and the generated result may be received to perform the operation.

The robot 100*a* may use at least one of the map data, the object information detected from the sensor information, or the object information acquired from the external device to determine the travel route and the travel plan, and may control the driving unit such that the robot 100*a* travels along the determined travel route and travel plan.

The map data may include object identification information about various objects arranged in the space in which the robot 100*a* moves. For example, the map data may include object identification information about fixed objects such as walls and doors and movable objects such as pollen and desks. The object identification information may include a name, a type, a distance, and a position.

In addition, the robot 100*a* may perform the operation or travel by controlling the driving unit based on the control/interaction of the user. Here, the robot 100*a* may acquire the intention information of the interaction due to the user's operation or speech utterance, and may determine the response based on the acquired intention information, and may perform the operation.

<AI+Self-Driving>

The self-driving vehicle 100*b*, to which the AI technology is applied, may be implemented as a mobile robot, a vehicle, an unmanned flying vehicle, or the like.

The self-driving vehicle 100*b* may include a self-driving control module for controlling a self-driving function, and the self-driving control module may refer to a software module or a chip implementing the software module by hardware. The self-driving control module may be included in the self-driving vehicle 100*b* as a component thereof, but may be implemented with separate hardware and connected to the outside of the self-driving vehicle 100*b*.

The self-driving vehicle 100*b* may acquire state information about the self-driving vehicle 100*b* by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling route by using the recognized surrounding information or object information. The learning model may be learned directly from the self-driving vehicle 100a or may be learned from an external device such as the AI server 200.

Here, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external device to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. Here, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

Here, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given route without the user's control or moves for itself by determining the route by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

Here, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100*a*, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100*a*, to which the XR technology is applied, may refer to a robot that is subjected to control/interaction in an XR image. In this case, the robot 100*a* may be separated from the XR device 100*c* and interwork with each other.

When the robot 100*a*, which is subjected to control/interaction in the XR image, may acquire the sensor information from the sensors including the camera, the robot 100*a* or the XR device 100*c* may generate the XR image based on the sensor information, and the XR device 100*c* may output the generated XR image. The robot 100*a* may operate based on the control signal input through the XR device 100*c* or the user's interaction.

For example, the user can confirm the XR image corresponding to the time point of the robot 100*a* interworking remotely through the external device such as the XR device 100*c*, adjust the self-driving travel path of the robot 100*a* through interaction, control the operation or driving, or confirm the information about the surrounding object.

<AI+Self-Driving+XR>

The self-driving vehicle 100*b*, to which the AI technology and the XR technology are applied, may be implemented as a mobile robot, a vehicle, an unmanned flying vehicle, or the like.

The self-driving driving vehicle 100*b*, to which the XR technology is applied, may refer to a self-driving vehicle having a means for providing an XR image or a self-driving vehicle that is subjected to control/interaction in an XR image. Particularly, the self-driving vehicle 100*b* that is subjected to control/interaction in the XR image may be distinguished from the XR device 100*c* and interwork with each other.

The self-driving vehicle 100*b* having the means for providing the XR image may acquire the sensor information from the sensors including the camera and output the generated XR image based on the acquired sensor information. For example, the self-driving vehicle 100*b* may include an HUD to output an XR image, thereby providing a passenger with a real object or an XR object corresponding to an object in the screen.

Here, when the XR object is output to the HUD, at least part of the XR object may be outputted so as to overlap the actual object to which the passenger's gaze is directed. Meanwhile, when the XR object is output to the display provided in the self-driving vehicle 100*b*, at least part of the XR object may be output so as to overlap the object in the screen. For example, the self-driving vehicle 100*b* may output XR objects corresponding to objects such as a lane, another vehicle, a traffic light, a traffic sign, a two-wheeled vehicle, a pedestrian, a building, and the like.

When the self-driving vehicle 100*b*, which is subjected to control/interaction in the XR image, may acquire the sensor information from the sensors including the camera, the self-driving vehicle 100*b* or the XR device 100*c* may generate the XR image based on the sensor information, and the XR device 100*c* may output the generated XR image. The self-driving vehicle 100*b* may operate based on the control signal input through the external device such as the XR device 100*c* or the user's interaction.

Figure 4:
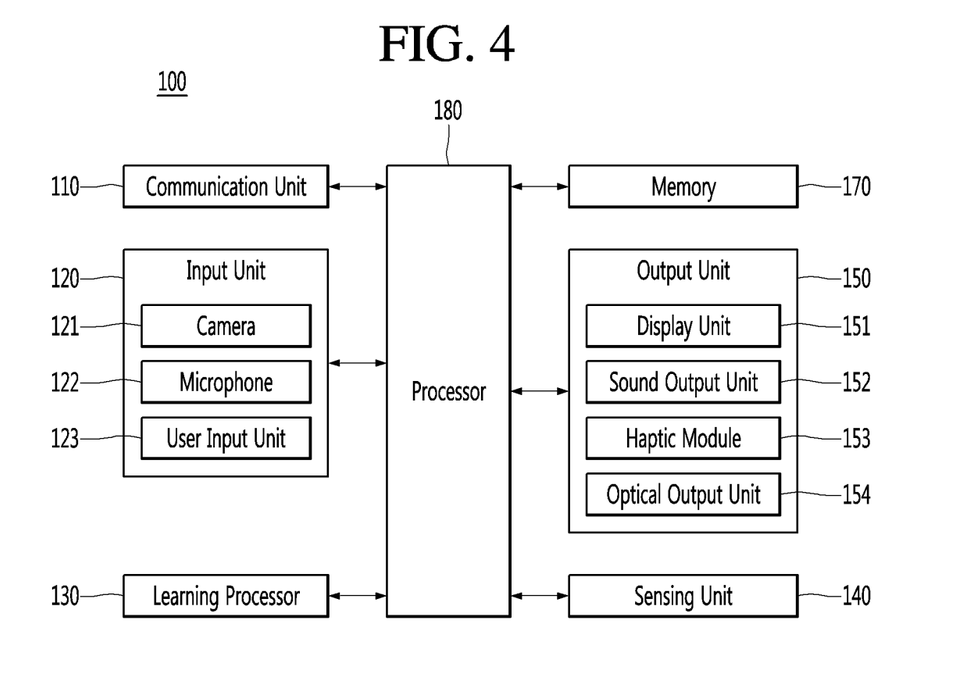
FIG. 4 is a block diagram illustrating an AI apparatus according to an embodiment of the present disclosure.

FIG. 4 is a block diagram illustrating an AI apparatus 100 according to an embodiment of the present disclosure.

The redundant repeat of FIG. 1 will be omitted below.

In the present disclosure, the AI apparatus 100 may include an edge device.

Hereinafter, the AI communication unit 110 may also be referred to as a communicator.

Referring to FIG. 4, the input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information inputted from a user and the AI apparatus 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the AI apparatus 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the AI apparatus 100 to correspond to the inputted information.

The user input unit 123 may include a mechanical input means (or a mechanical key, for example, a button, a dome switch, a jog wheel, and a jog switch at the front, back or side of the AI apparatus 100) and a touch type input means. As one example, a touch type input means may include a virtual key, a soft key, or a visual key, which is displayed on a touch screen through software processing or may include a touch key disposed at a portion other than the touch screen.

The sensing unit 140 may also be referred to as a sensor unit.

The output unit 150 may include at least one of a display unit 151, a sound output module 152, a haptic module 153, or an optical output module 154.

The display unit 151 may display (output) information processed in the AI apparatus 100. For example, the display unit 151 may display execution screen information of an application program running on the AI apparatus 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the AI apparatus 100 and a user, and an output interface between the AI apparatus 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI apparatus 100. An example of an event occurring in the AI apparatus 100 includes message reception, call signal reception, missed calls, alarm, schedule notification, e-mail reception, and information reception through an application.

Figure 5:
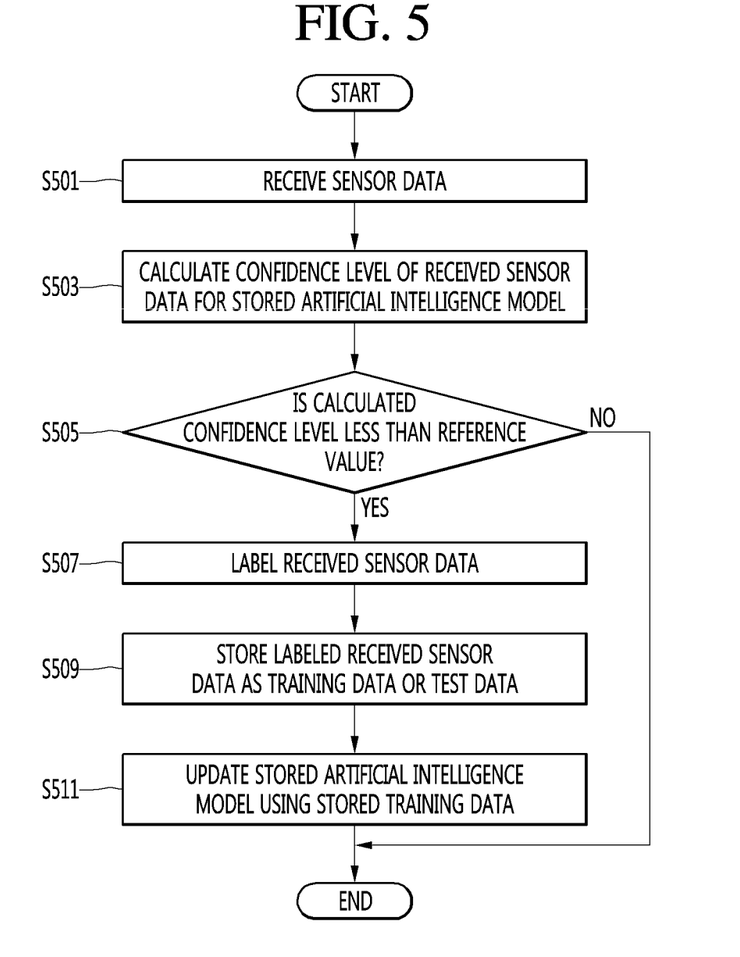
FIG. 5 is a flowchart illustrating a method of updating an artificial intelligence model according to an embodiment of the present disclosure.

FIG. 5 is a flowchart illustrating a method of updating an artificial intelligence model according to an embodiment of the present disclosure.

Referring to FIG. 5, the processor 180 of the AI apparatus 100 receives sensor data (S501).

The processor 180 may receive the sensor data from the sensing unit 140 or receive the sensor data from an external apparatus via the communication unit 110. For example, the processor 180 may receive the sensor data acquired by an Internet of Things (IoT) device via the communication unit 110.

The sensor data may include at least one of sound data, image data, text data or measured data. For example, the sensor data may include sound data including the speech of a user, image data including the face of the user, text data input by the user or temperature data acquired from a temperature sensor.

In addition, the processor 180 of the AI apparatus 100 calculates a confidence level of the received sensor data for a stored artificial intelligence model (S503).

The artificial intelligence model is stored in the memory 170. The artificial intelligence model includes an artificial neural network and may be trained using a machine learning algorithm or a deep learning algorithm. The artificial intelligence model may include a classification, a recognition model or the like.

The processor 180 may generate a result corresponding to the received sensor data using the artificial intelligence model stored in the memory 170 and calculate a confidence level of the received sensor data based on the generated result.

The processor 180 may calculate the confidence level of the received sensor data based on an entropy corresponding to the generated result, a first-rank confidence level $p_1$ included in the generated result, a difference between the first-rank confidence level $p_1$ and a second-rank confidence level $p_2$ included in the generated result or the like.

When the artificial intelligence model is a classification model, the result generated using the artificial intelligence model may include a confidence level with which the received sensor data is determined to be each class. The first-rank confidence level may mean the highest confidence level among reliabilities determined for each class and the second-rank confidence level may mean the second highest confidence level among the reliabilities determined for each class. The entropy corresponding to the generated result may mean the expected value of the absolute value of the log value of the confidence level of each class.

For example, it is assumed that the artificial intelligence model recognizes a dog, a cat or a rabbit and received first and second sensor data is image data including a dog. If a result generated by the artificial intelligence model from the first sensor data is (dog, cat, rabbit)=(0.7, 0.25, 0.05), the first-rank confidence level is 0.7, the difference between the first-rank confidence level and the second-rank confidence level is 0.45, the entropy is 0.3240 (=|0.7*log 0.7+0.25*log 0.25+0.05*log 0.05|). In contrast, if a result generated by the artificial intelligence model from the second sensor data is (dog, cat, rabbit)=(0.6, 0.3, 0.1), the first-rank confidence level is 0.6, the difference between the first-rank confidence level and the second-rank confidence level is 0.3, and the entropy is 0.3900 (=|0.6*log 0.6+0.3*log 0.3+0.1*log 0.1|). The artificial intelligence model has recognized the dog with a higher confidence level in the first sensor data as compared to the second sensor data, and thus the first-rank confidence level corresponding to the result generated from the first sensor data and the difference between the first-rank confidence level and the second-rank confidence level are larger and the entropy is smaller, as compared to the second sensor data. That is, the confidence level of the generated result may be regarded as increasing as the first-rank confidence level corresponding to the generated result increases, as the difference between the first-rank confidence level and the second-rank confidence level increases and as the entropy decreases.

In addition, the processor 180 of the AI apparatus 100 determines whether the calculated confidence level is less than a reference value (S505).

The confidence level of the received sensor data for the stored artificial intelligence model being high may mean that the confidence level of the result corresponding to the received sensor data is high. That is, if the result inferred from the received sensor data is ambiguous, the confidence level of the received sensor data for the stored artificial intelligence model is calculated to be low.

If the calculated confidence level is high, the sensor data may be sufficiently trained in the stored artificial intelligence model and thus it may be determined that additional learning is not urgent. Similarly, if the calculated confidence level is low, the sensor data may not be sufficiently trained in the stored artificial intelligence model and thus it may be determined that additional learning is urgent.

The reference value for the calculated confidence level may be individually set according to the type of the confidence level. For example, as the reference value for the calculated confidence level, a reference value corresponding to the entropy, a reference value corresponding to the first-rank confidence level, a reference value corresponding to the difference between the first-rank confidence level and the second-rank confidence level or the like may be individually set. That is, if the confidence level is calculated from the entropy, the processor 180 may use the reference value corresponding to the entropy.

If the calculated confidence level is equal to or greater than the reference value as the result of determination of step S505, the processor 180 of the AI apparatus 100 may finish the procedure.

Finishing the procedure may mean that the procedure of processing the sensor data received in step S501 is finished and the procedure may return to step S501 of receiving the sensor data.

If the calculated confidence level is less than the reference value as the result of determination of step S505, the processor 180 of the AI apparatus 100 labels the received sensor data (S507).

The label may mean a result to be inferred or a correct answer to be inferred when the received sensor data is input to the artificial intelligence model stored in the memory 170. Labeling may mean operation of adding a label to the received sensor data.

The processor 180 may extract a pseudo label from the received sensor data using a pseudo labeler and add the extracted pseudo label to the received sensor data, thereby labeling the received sensor data. The pseudo labeler may mean a model for automatically generating a pseudo label without human intervention. The pseudo label is generated by the pseudo labeler, is automatically generated without human intervention and thus may be different from a correct answer to be actually inferred by the artificial intelligence model.

The pseudo labeler may include an artificial neural network. The pseudo labeler may be trained using a machine learning algorithm or a deep learning algorithm.

The pseudo labeler may be trained using semi-supervised learning. In this case, the pseudo labeler does not need to be equal to the artificial intelligence model stored in the memory 170. In addition, the pseudo labeler may be trained in the processor 180 or the learning processor 130 and stored in the memory 170 or may be trained in the learning processor 230 or the processor 240 of the AI server 200 and stored in the memory 170.

Alternatively, the pseudo labeler may have the same model parameter as the artificial intelligence model stored in the memory 170. In this case, the pseudo labeler may be equal to the artificial intelligence model stored in the memory 170. That is, the pseudo labeler may mean the artificial intelligence model stored in the memory 170.

In addition, the processor 180 of the AI apparatus 100 stores the labeled received sensor data in the memory 170 as training data or test data (S509).

The training data is used to update the model parameters of the artificial intelligence model, and the test data may be used to evaluate the performance of the artificial intelligence model. Each of the training data and the test data may include sensor data and a label extracted in correspondence therewith.

The processor 180 may classify a predetermined ratio of the labeled sensor data as the training data and classify the rest as the test data. For example the processor 180 may classify 90% of the labeled sensor data as the training data and classify 10% of the labeled sensor data as the test data.

The memory 170 may accumulate and store not only the training data previously used to train the artificial intelligence model but also the training data newly generated from the sensor data.

Since the confidence level of the artificial intelligence model stored in the memory 170 among the received sensor data is less than the reference value and only the sensor data which is not accurately determined by the artificial intelligence model is selected, only a much smaller amount of training data may be stored rather than all the sensor data being stored as the training data. Further, since the sensor data which is well determined by the artificial intelligence model is excluded from the training data, even if the amount of training data is reduced, it is possible to more efficiently update the artificial intelligence model. In this case, performance which can be expected for each training data is further improved.

In addition, the learning processor 130 or the processor 180 of the AI apparatus 100 updates the stored artificial intelligence model using the training data stored in the memory 170 (S511).

The training data used to update the model parameters of the artificial intelligence model may include not only the training data newly generated from the received sensor data but also the training data previously used to train the artificial intelligence model and the training data generated from the previously received sensor data.

The processor 180 or the learning processor 130 may update the model parameters of the artificial intelligence model stored in the memory 170 using the training data stored in the memory 170. The model parameters may include weights and biases of nodes configuring the artificial intelligence model, and the weights and biases of the nodes may be updated to reduce a loss function of the artificial intelligence model using a gradient descent method and the like.

The processor 180 or the processor 130 may calculate the performance of the artificial intelligence model which is being updated using the test data stored in the memory, when the artificial intelligence model is updated using the training data, and determine whether the update of the artificial intelligence model is repeated based on change in performance of the artificial intelligence model which is being updated.

Further, the processor 180 or the learning processor 130 may optimize the hyperparameter of the artificial intelligence model stored in the memory 170 using an automated machine learning (AutoML) scheme or perform neural architecture search (NAS). Optimizing hyperparameter means finding a hyperparameter capable of deriving the best performance when training the artificial neural network. Neural architecture search means automatically searching the structure and weight of an artificial neural network most suitable for target data and task.

The hyperparameter of the artificial intelligence model may include the structure of the artificial intelligence model. Therefore, the processor 180 or the learning processor 130 may update the previously stored artificial intelligence model using the training data accumulated and stored in the memory 170, thereby acquiring an artificial intelligence model having better performance.

The processor 180 or the learning processor 130 may determine the performance of the artificial intelligence models generated in a process of optimizing the hyperparameter or a neural architecture search process, using the test data accumulated and stored in the memory 170, and select the hyperparameter or the neural architecture for providing highest performance, thereby updating the artificial intelligence model.

According to steps S501 to S511 shown in FIG. 5, the edge device or the terminal AI apparatus 100, which does not have higher computing power than the AI server 200, may update and manage the artificial intelligence model installed therein. This means that the AI apparatus 100 may actively manage and use the artificial intelligence model without depending on the user or external apparatuses (e.g., another AI apparatus, an IoT apparatus or an AI server). Accordingly, even if the AI apparatus 100 does not have a communication function or have a communication function but is in an environment in which the communication function cannot be performed, the AI apparatus may update the artificial intelligence model by itself with a small amount of computation.

Steps S501 to S511 of updating the artificial intelligence model shown in FIG. 5 may be repeatedly performed.

In addition, although the method of updating the artificial intelligence model by the AI apparatus 100 is shown in FIG. 5, the present disclosure is not limited thereto. That is, the AI server 200 may update the artificial intelligence model using the same method.

Figure 6:
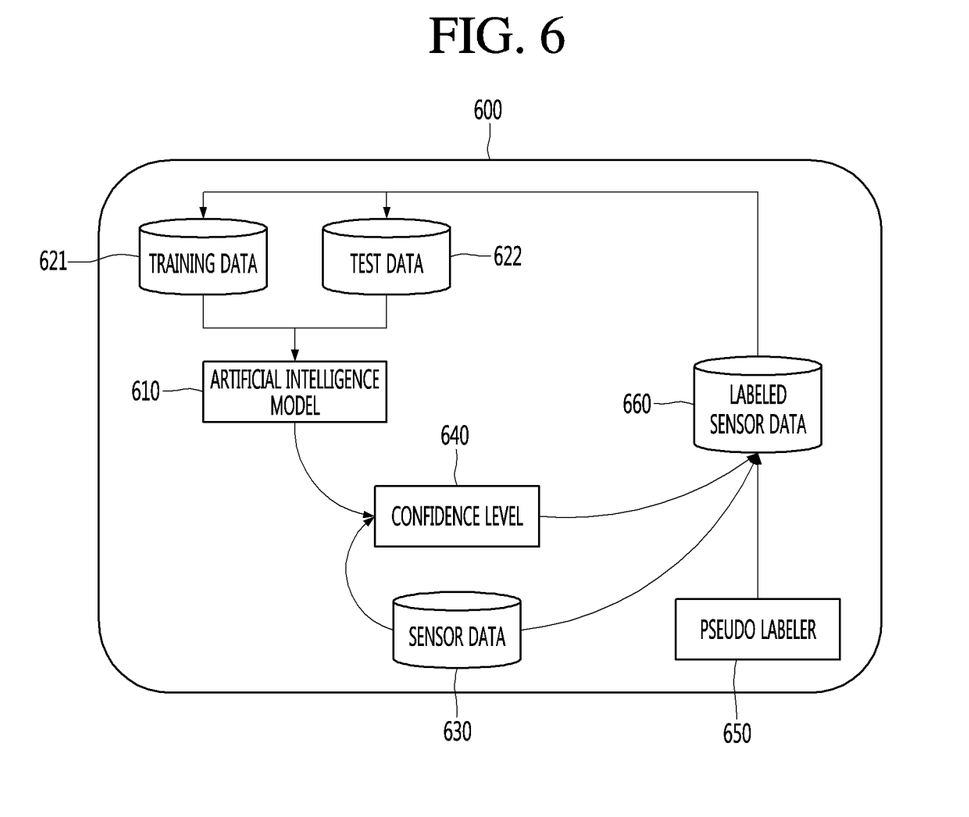
FIG. 6 is a view illustrating a method of updating an artificial intelligence model according to an embodiment of the present disclosure.

FIG. 6 is a view illustrating a method of updating an artificial intelligence model according to an embodiment of the present disclosure.

Referring to FIG. 6, the AI apparatus 600 may train the artificial intelligence model 610 using the training data 621 and the test data 622. The artificial intelligence model 610 includes an artificial neural network, and the training data 621 is used to update the model parameters of the artificial intelligence model 610. The test data 622 is used to evaluate the performance of the artificial intelligence model 610.

The AI apparatus 600 may repeatedly train the artificial intelligence model 610 using the training data 621. In addition, the AI apparatus 600 may calculate the performance of the artificial intelligence model 610 using the test data 622, and determine the number of times of repeatedly training the artificial intelligence model 610 based on the calculated performance.

When new sensor data 630 is received, the AI apparatus 600 may calculate the confidence level 640 of the sensor data 630 using the artificial intelligence model 610.

If the calculated confidence level 640 is equal to or greater than a reference value, this means that the artificial intelligence model 610 generates a result with a high confidence level from the sensor data 630. That is, even if the artificial intelligence model 610 is trained using the sensor data 630 having a high confidence level, it is difficult to expect significant performance improvement.

In contrast, if the calculated confidence level 640 is less than the reference value, this means that the artificial intelligence model 610 generates a result with a low confidence level from the sensor data 630. If the artificial intelligence model 610 is trained using the sensor data 630 having a low confidence level, it is possible to expect significant performance improvement.

The AI apparatus 600 may extract a label from the sensor data 630, the calculated confidence level 640 of which is less than the reference value, using the pseudo labeler 650, thereby labeling the sensor data 630. As the result of labeling the sensor data 630, the labeled sensor data 660 is generated. The pseudo labeler 650 may be trained independently of the artificial intelligence model 610 or may be equal to the artificial intelligence model 610.

The AI apparatus 600 may accumulate and store the labeled sensor data 660 as the training data 621 or the test data 622. That is, the training data 621 and the test data 622 includes not only data previously used to train the artificial intelligence model 610 but also data newly generated from the labeled sensor data 660.

The AI apparatus 600 may update the artificial intelligence model 610 using the accumulated and stored training data 621 and test data 622. The AI apparatus 600 may update only the model parameters of the artificial intelligence model 610 or may update the hyperparameter including the structure of the artificial intelligence model 610.

Figure 7:
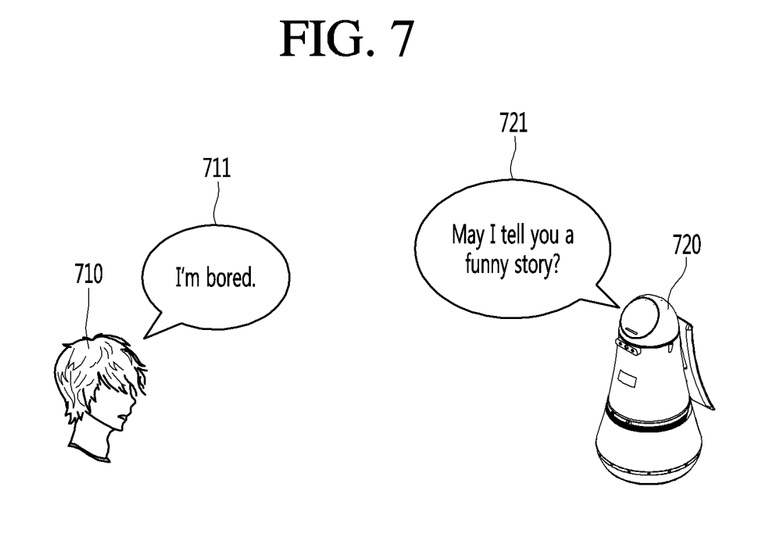
FIG. 7 is a view illustrating an example of updating an artificial intelligence model according to an embodiment of the present disclosure.

FIG. 7 is a view illustrating an example of updating an artificial intelligence model according to an embodiment of the present disclosure.

Referring to FIG. 7, the AI apparatus 720 may interact with a user by speech and include an artificial intelligence speaker, a smartphone, an artificial intelligence robot, etc. In addition, the AI apparatus 720 may store an artificial intelligence model for recognizing the speech of the user from sound data.

When the user 710 utters "I'm bored." 711, the AI apparatus 720 may receive speech data corresponding to the uttered speech "I'm bored." 711 of the user, convert the speech data into a string using the artificial intelligence model, and grasp the intent of the converted string to generate a response. If the AI apparatus 720 successfully recognizes the uttered speech "I'm bored." 711 of the user, the AI apparatus may provide "May I tell you a funny story?" 721 in response thereto.

However, even if the AI apparatus 720 accurately recognizes the uttered speech "I'm bored." 711 of the user, the confidence level of recognition may be different. Accordingly, the AI apparatus 720 may calculate the confidence level of the recognition result based on the entropy of the recognition result, the first-rank confidence level, and the difference between the first-rank confidence level and the second-rank confidence level, and determine whether to generate the training data or the test data from the acquired speech data based on the calculated confidence level.

In a first example, it is assumed that the artificial intelligence model determines that a probability that the uttered speech 711 of the user is "bored" is 0.8 and a probability that the uttered speech 711 of the user is "board" is 0.2. In a second example, it is assumed that the artificial intelligence model determines that a probability that the uttered speech 711 of the user is "bored" is 0.6 and a probability that the uttered speech 711 of the user is "board" is 0.4. In these examples, the artificial intelligence model accurately determines that the uttered speech 711 of the user is "bored". However, in the first example, since the first-rank confidence level is 0.8, the confidence level of the recognition result is high. However, in the second example, since the first-rank confidence level is 0.6, the confidence level of the recognition result is relatively low. Similarly, in the first example, since the difference between the first-rank confidence level and the second-rank confidence level is 0.6, the confidence level of the recognition result is high. However, in the second example, since the difference between the first-rank confidence level and the second-rank confidence level is 0.2, the confidence level of the recognition result is relatively low. Accordingly, if the confidence level of the recognition result is lower than a predetermined reference value as in the second example, the AI apparatus 720 may generate the training data or the test data from the acquired speech data.

Upon determining that the AI apparatus 720 generates the training data or the test data from the acquired speech data, the AI apparatus 720 may label the speech data using the pseudo labeler, accumulate and store the labeled speech data as the training data or the test data, and update the artificial intelligence model using the stored training data and test data.

Figure 8:
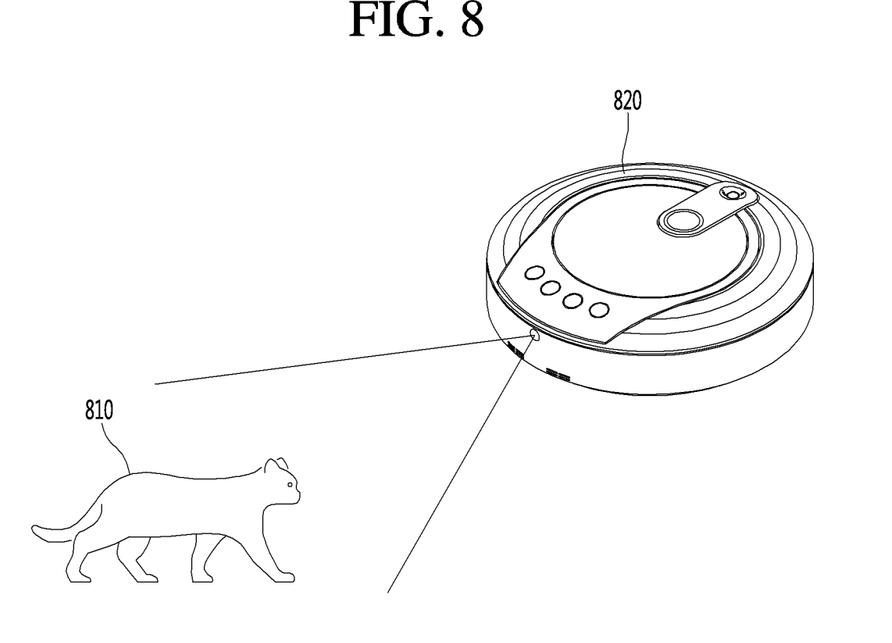
FIG. 8 is a view illustrating an example of updating an artificial intelligence model according to an embodiment of the present disclosure.

FIG. 8 is a view illustrating an example of updating an artificial intelligence model according to an embodiment of the present disclosure.

Referring to FIG. 8, the AI apparatus 820 may recognize an object from image data and include a robot cleaner, etc. In addition, the AI apparatus 820 may store an artificial intelligence model for recognizing the object from the image data.

When the AI apparatus 820 is a robot cleaner, the AI apparatus 820 may acquire image data of the surroundings using a camera while traveling, when performing cleaning operation, recognize the object from the image data to determine whether there is an obstacle, and reflect the obstacle identified from the image data in updating a map (e.g., SLAM map) or a cleaning path of a cleaning space later. However, if the object is a moving obstacle or a temporary obstacle instead of a fixed obstacle, the obstacle will be carefully reflected in updating the map or the cleaning path of the cleaning space.

When a cat 810 is located in front of the AI apparatus 820, the AI apparatus 820 may acquire image data including the cat 810, try to recognize the cat 810 included in the image data, and modify a current cleaning path to avoid the cat 810 once presence of the obstacle is identified. If the AI apparatus 820 successfully recognizes that the front object is the cat 810, the weight of information on the recognized cat 810 may be set to be low in updating the map or the cleaning path of the cleaning space later.

However, even if the AI apparatus 820 accurately recognizes that the front object is the cat 810, confidence level of recognition may be different. Accordingly, the AI apparatus 820 may calculate the confidence level of the recognition result based on the entropy of the recognition result, the first-rank confidence level, and the difference between the first-rank confidence level and the second-rank confidence level, and determine whether to generate the training data or the test data from the acquired image data based on the calculated confidence level.

In a first example, it is assumed that the artificial intelligence model determines that a probability that the front object is a cat is 0.75 and a probability that the front object is a table is 0.25. In a second example, it is assumed that the artificial intelligence model determines that a probability that the front object is a cat is 0.55 and a probability that the front object is a table is 0.45. In these examples, the artificial intelligence model accurately determines that the front object included in the image data is a cat. However, in the first example, since the first-rank confidence level is 0.75, the confidence level of the recognition result is high. However, in the second example, since the first-rank confidence level is 0.55, the confidence level of the recognition result is relatively low. Similarly, in the first example, since the difference between the first-rank confidence level and the second-rank confidence level is 0.5, the confidence level of the recognition result is high. However, in the second example, since the difference between the first-rank confidence level and the second-rank confidence level is 0.1, the confidence level of the recognition result is relatively low. Accordingly, if the confidence level of the recognition result is lower than a predetermined reference value as in the second example, the AI apparatus 820 may generate the training data or the test data from the acquired image data.

Upon determining that the AI apparatus 820 generates the training data or the test data from the acquired image data, the AI apparatus 820 may label the image data using the pseudo labeler, accumulate and store the labeled image data as the training data or the test data, and update the artificial intelligence model using the stored training data and test data.

According to various embodiments of the present disclosure, it is possible to efficiently update an artificial intelligence model with a small amount of computation without intervention of a user or an artificial intelligence server, by selecting only sensor data effective for the artificial intelligence model from received sensor data and using the selected sensor data as training data.

According to an embodiment of the present disclosure, the above-described method may be implemented as a processor-readable code in a medium where a program is recorded. Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

What is claimed is:

1. An artificial intelligence apparatus for updating an artificial intelligence model, the artificial intelligence apparatus comprising:
    a memory configured to store an artificial intelligence model and training data for the artificial intelligence model; and
    a processor configured to:
        receive sensor data,
        calculate a confidence level of the received sensor data for the stored artificial intelligence model,
        label first sensor data when the calculated confidence level is less than a reference value, and exclude from labeling, second sensor data when the calculated confidence level is equal to or greater than the reference value,
        store the labeled first sensor data in the memory as the training data or test data, and
        update the stored artificial intelligence model using only the stored training data.

2. The artificial intelligence apparatus of claim 1, wherein the processor is configured to label the first sensor data by extracting a pseudo label from the received sensor data using a pseudo labeler.

3. The artificial intelligence apparatus of claim 2, wherein the pseudo labeler has the same model parameter as the stored artificial intelligence model.

4. The artificial intelligence apparatus of claim 1, wherein the processor is configured to update model parameters of the artificial intelligence model stored in the memory using the training data stored in the memory.

5. The artificial intelligence apparatus of claim 4, further comprising a learning processor,
    wherein the processor is configured to update the artificial intelligence model stored in the memory using the learning processor.

6. The artificial intelligence apparatus of claim 4, wherein the processor is configured to evaluate performance of the updated artificial intelligence model using the test data stored in the memory.

7. The artificial intelligence apparatus of claim 1, wherein the processor is configured to:
    generate a result corresponding to the received sensor data using the stored artificial intelligence model, and
    calculate the confidence level of the received sensor data based on the generated result.

8. The artificial intelligence apparatus of claim 7, wherein the confidence level of the received sensor data is determined based on an entropy corresponding to the generated result, a first-rank confidence level included in the generated result or a difference between the first-rank confidence level and a second-rank confidence level included in the generated result.

9. The artificial intelligence apparatus of claim 8, wherein the processor is configured to:
    calculate the confidence level to be higher as the entropy decreases,
    calculate the confidence level to be higher as the first-rank confidence level increases, and
    calculate the confidence level to be higher as the difference between the first-rank confidence level and the second-rank confidence level increases.

10. The artificial intelligence apparatus of claim 1, wherein the sensor data includes at least one of sound data, image data, text data or measured data.

11. The artificial intelligence apparatus of claim 10, further comprising a sensor device including at least one sensor,
    wherein the processor is configured to receive the sensor data from the sensor device.

12. The artificial intelligence apparatus of claim 11, further comprising a communicator configured to communicate with an external device, wherein the processor is configured to receive the sensor data from the external device via the communicator.

13. A method of updating an artificial intelligence model, the method performed by an artificial intelligence apparatus, the method comprising:

receiving sensor data, calculating a confidence level of the received sensor data for an artificial intelligence model stored in a memory, labeling first sensor data when the calculated confidence level is less than a reference value, and excluding from labeling, second sensor data when the calculated confidence level is equal to or greater than the reference value, storing the labeled first sensor data in the memory as training data or test data, and updating the stored artificial intelligence model using only the stored training data.

14. A non-transitory computer readable recording medium containing a program for causing an artificial intelligence apparatus, the method comprising:

receiving sensor data, calculating a confidence level of the received sensor data for an artificial intelligence model stored in a memory, labeling first sensor data when the calculated confidence level is less than a reference value, and excluding from labeling, second sensor data where the calculated confidence level is equal to or greater than the reference value, storing the labeled first sensor data in the memory as training data or test data, and updating the stored artificial intelligence model using only the stored training data.

* * * * *